(12) United States Patent
Shi

(10) Patent No.: US 6,507,740 B2
(45) Date of Patent: *Jan. 14, 2003

(54) ADAPTIVE THRESHOLD OF HANDOFF IN MOBILE TELECOMMUNICATION SYSTEMS

(75) Inventor: Hong Shi, Carey, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,922

(22) Filed: May 18, 1999

(65) Prior Publication Data

US 2002/0102977 A1 Aug. 1, 2002

(51) Int. Cl.[7] .................................................. H04Q 7/20
(52) U.S. Cl. ..................... 455/437; 455/436; 455/67.1
(58) Field of Search ................................. 455/437, 436, 455/442, 443, 67.1, 513, 452

(56) References Cited

U.S. PATENT DOCUMENTS

| | | | |
|---|---|---|---|
| 5,067,171 A | * 11/1991 | Kawano | 455/436 |
| 5,239,682 A | 8/1993 | Strawcynski et al. | |
| 5,260,944 A | 11/1993 | Tomabechi | |
| 5,280,630 A | 1/1994 | Wang | |
| 5,483,669 A | * 1/1996 | Barnett et al. | 455/437 |
| 5,666,655 A | 9/1997 | Ishikawa et al. | |
| 5,673,307 A | * 9/1997 | Holland et al. | 455/436 |
| 5,701,585 A | * 12/1997 | Kallin et al. | 455/437 |
| 5,701,586 A | * 12/1997 | Tabbane et al. | 455/422 |
| 5,870,666 A | * 2/1999 | Tanaka et al. | 455/67.1 |
| 6,049,716 A | * 4/2000 | Jung | 455/442 |
| 6,163,694 A | * 12/2000 | Lind et al. | 455/422 |
| 6,240,275 B1 | * 5/2001 | H'Mimy et al. | 455/62 |
| 6,337,984 B1 | * 1/2002 | Hong et al. | 455/439 |

* cited by examiner

*Primary Examiner*—Edward F. Urban
*Assistant Examiner*—Erika A. Gary
(74) *Attorney, Agent, or Firm*—Brinks Hofer Gilson & Lione (57) ABSTRACT

A method and apparatus for adapting the handoff threshold in a mobile communication system. The method includes the steps of evaluating the signal quality for the communication and lowering the dynamic threshold to encourage handoff if the signal quality indicator is lower than a preset quality threshold. The preset quality threshold represents a minimum acceptable signal quality level. The dynamic threshold may, in the alternative, be raised to discourage handoff if the signal quality indicator of the communication is at or near a maximum signal quality representing a signal having few errors. The apparatus includes means for scanning the radio environment at the mobile unit to evaluate signal strength and signal quality conditions of alternative channels in the same or neighboring cells, means for determining whether the mobile unit is participating in an off-hook communication or a standby communication, means for selecting a dynamic threshold corresponding to a signal strength value in accordance with the signal quality of the present communication and whether the signal quality is below or at a maximum or minimum value, and means for handing off the communication to an alternative channel if the signal strength of the channel measured at the mobile unit exceeds the dynamic threshold.

22 Claims, 6 Drawing Sheets

FIG. 7

ADAPTIVE THRESHOLD OF HANDOFF IN MOBILE TELECOMMUNICATION SYSTEMS

BACKGROUND OF THE INVENTION

The present invention relates to mobile communications systems. In particular, the invention relates to a method and apparatus for adapting the handoff threshold in such systems.

Channel handoff or handover is an essential technology in cellular communication systems. It allows the mobile unit user to move from cell to cell within system coverage areas without breaking an ongoing telephone call and without loosing synchronization with the system when the mobile is on-hook. There are mainly two type of inter-cell handoffs: hard handoff and soft handoff.

Figure 1:
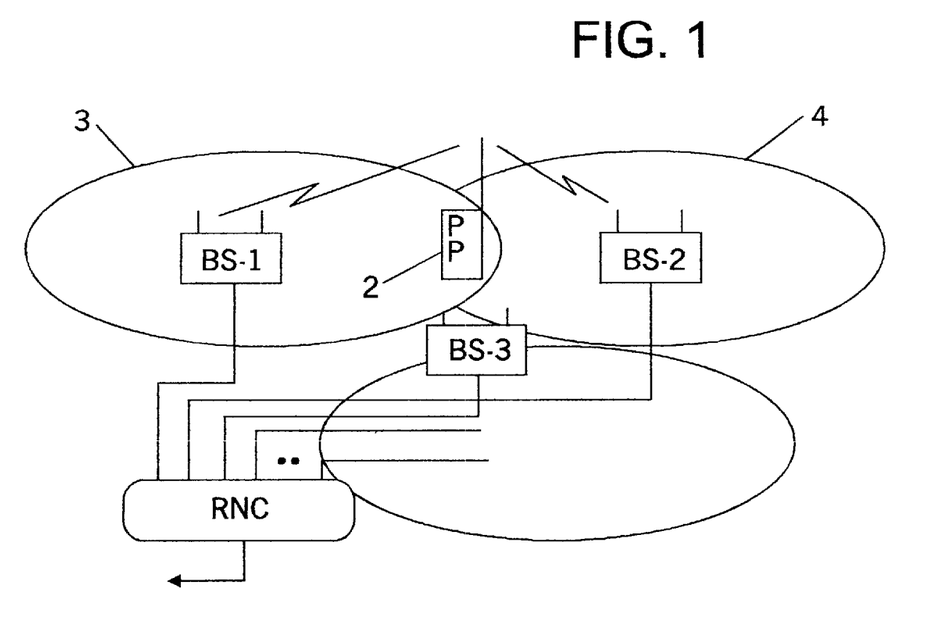
FIG. 1 is a block diagram illustrating a typical handoff situation capable of utilizing the present invention.

In a hard handoff case, as illustrated in FIG. 1, the base stations in the system are periodically scanning channels in their receiving frequency band and sending the scanning results back to a radio network controller (RNC). In some systems, the mobile units are also periodically scanning all channels in their receiving bands and using idle time slots to send the scanning results to the controller through their serving base stations. The scanning information contains radio signal strength indicators (RSSI), bit error rates other channel information. The controller processes channel information from all of its base stations and mobile units.

Assuming that the mobile unit 2 in FIG. 1 is currently served by BS-1 and cell 3, the movement of the mobile unit towards BS-2 and cell 4 creates a candidate for handoff to BS-2 and cell 4. The RNC evaluates the averaged RSSI difference between the mobile unit 2 and both BS-1 and BS-2. If following condition is met:

$$RSSI_{BS-2} - RSSI_{BS-1} \geq Threshold_{Handoff},\qquad(Eq.\ A)$$

the RNC will allocate an unused channel in BS-2 and handoff the physical connection of the mobile unit 2 from BS-1 to BS-2.

Because a minimum amount of time is needed to execute the handoff process, an ongoing call will experience a short break in transmission. The short break experienced by the user is an inconvenience, and has a bearing on overall service quality perception by the user. Furthermore, data transfer may be partially corrupted during the break.

In a soft or "seamless" handoff case, a mobile has two or more links with different base stations that are involved in the handoff process. For example, in FIG. 1, the old link between the mobile unit and BS-1 will be released only when a new radio link between the mobile unit and BS-2 is already established. Because of this, a mobile user will not notice the handoff break during an ongoing call. Equation A is a commonly used handoff criterion for soft handoff.

Digital wireless systems exist in which the handoff decision is made by mobiles. Typical examples are DECT and PWT-based systems. The DECT/PWT system is based on MC/TDMA/TDD technology. Because of TDD, the uplinks and downlinks use the same frequency carrier. In such a system, the handoff decision is made in the mobile unit. Soft handoff is used when the mobile user moves from cell to cell in the system coverage areas. These inter-cell handoffs also use the condition of Equation A as the triggering criterion for handoff.

Conventional inter-cell handoff processes (including hard handoff and soft handoff) normally comprise four steps: 1) Scanning the radio environment RSSI's; 2) processing the scanned RSSIs (RSSI is sometimes averaged with previously scanned values); 3) checking the handoff threshold ($RSSI(any\_BS) - RSSI(Active\_BS) \geq Threshold_{HO}$); and 4) executing the handoff procedure.

The main shortcoming of this procedure is that a fixed handoff threshold is often used in conventional systems. This mechanism operates effectively in high power, macrocellular systems with few, widely spaced base stations. More recently, however, users operate mobile units within densely populated areas or "pico-cellular environments" which exist in urban centers, cities, buildings and arenas. In such environments, the system is merely capacity limited. Thus, to meet system capacity needs, an area will be covered by more base stations than what signal strength requires. When mobile users move around the system coverage areas, a high number of system-wide inter-cell handoffs may occur.

Figure 2:
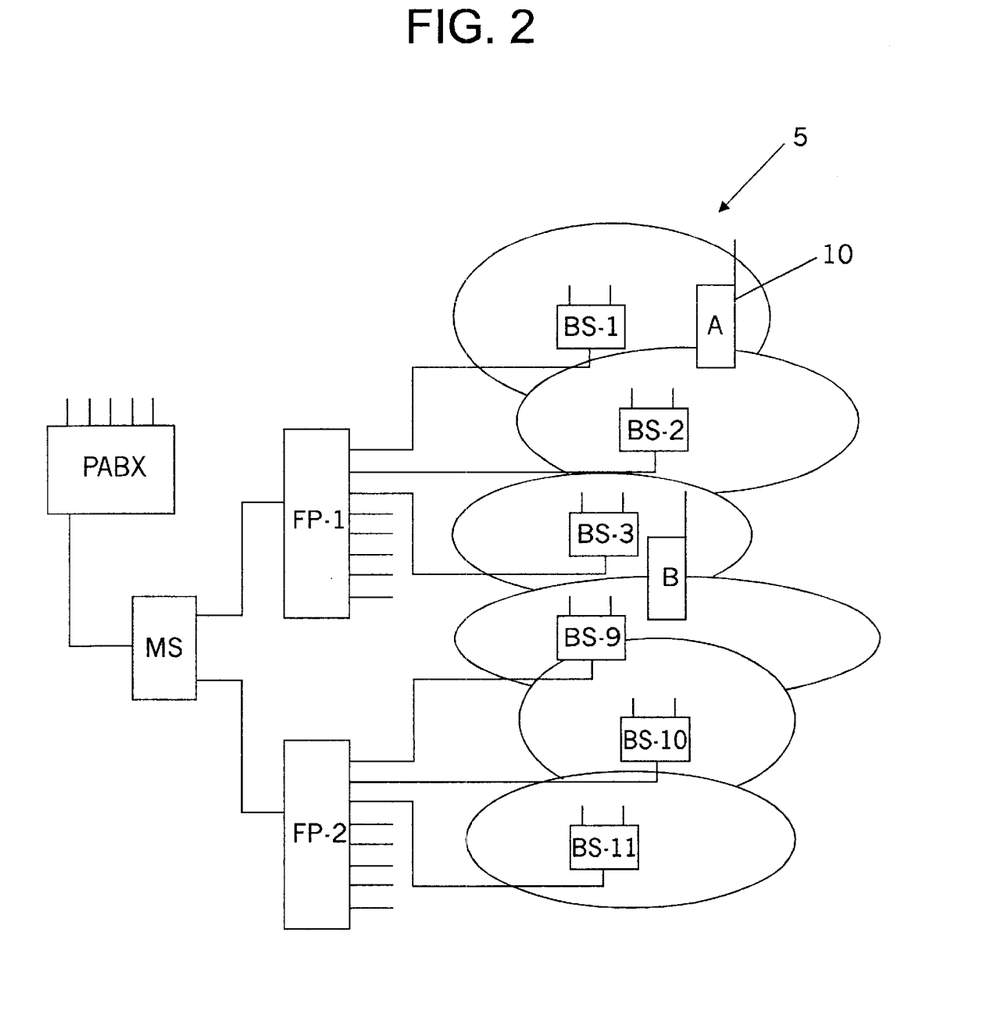
FIG. 2 is a block diagram illustrating a pico-cellular business wireless telephone system in a dense environment capable of utilizing the present invention.

FIG. 2 shows a typical pico-cellular business wireless system configuration 5. In this system, mobile users are allowed to move about the system coverage area when receiving incoming calls and making outgoing calls. When a mobile-A user moves from cell 1 to cell 2, and if the condition of Equation A is fulfilled, an inter-cell handoff will occur if mobile-A user is participating in an ongoing call. If the mobile-A user is not participating in a call, an inter-cell standby channel switch will occur. In either case, a certain amount of information processing and signaling exchange will take place to handle this event, thereby adding to the processing load of the system.

Figure 3:
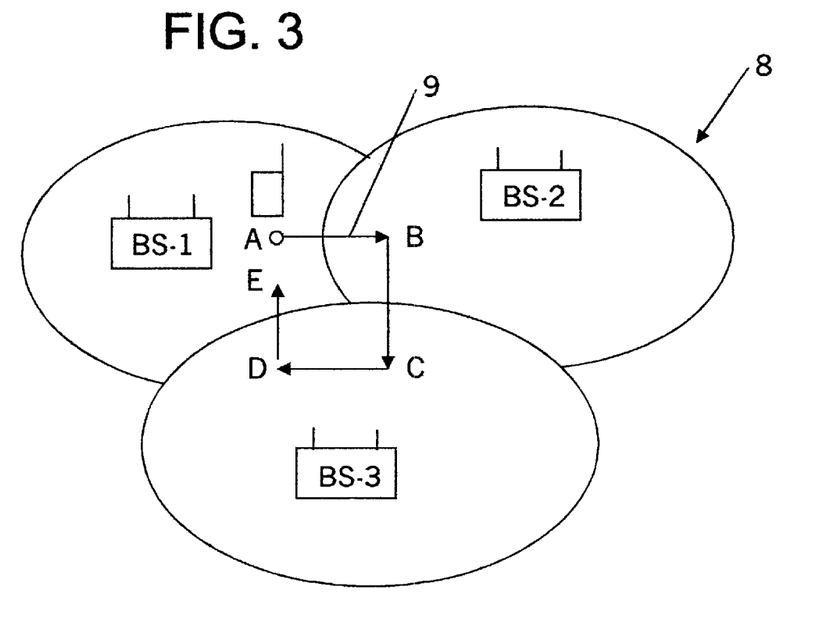
FIG. 3 is a block diagram of a subarea of the diagram of FIG. 2 illustrating a mobile user path through a coverage area.

A similar problem is illustrated in the block diagram of FIG. 3. Assuming a fixed handoff threshold in this cellular system 8, there are three potential inter-cell handoffs associated with the walking path 9 of user A if the system utilizes a relatively low handoff threshold. If the mobile unit is sufficiently covered by BS-1 during the entire walking path, the radio link between the mobile and BS-1 can be good enough to provide a high-quality connection throughout the path 9. These three potential inter-cell handoffs therefore become unnecessary and undesired.

This problem cannot be resolved by designing a high handoff threshold into the system. In a capacity limited system, radio link quality will be determined by an instantaneous signal-to-noise ratio. In FIG. 3, for example, if the mobile is in position B, a high threshold would require the mobile to maintain the radio link with remote BS-1 without handing off to BS-2. If the interference level is very high due to telephone traffic and other unsynchronized wireless systems operating in the same frequency band, the signal-to-noise ratio of the radio link between the mobile unit and BS-1 might not be sufficient to provide acceptable voice or data quality or, more seriously, cause a call drop.

Thus, optimization of both processing load and system service quality is difficult when the mobile utilizes a fixed inter-cell handoff threshold in an increasingly dynamic radio environment.

The solution to resolve this problem is to use an adaptive inter-cell handoff threshold. Often, however, these prior art threshold modification methods relied mostly on variations in signal strength of neighboring cells and the probability of good quality associated therewith, rather than evaluating the quality of the present communication link.

SUMMARY OF THE INVENTION

The present invention is directed to a method and apparatus of adapting a threshold for channel handoff and channel switch in cellular, PCS and business wireless communication systems. When the interference level in a radio environment is low, the proposed method and apparatus solves the problems of unnecessary inter-cell handoff when the mobile unit user is moving within the system coverage areas. When the interference level is high, the proposed method and apparatus provides a new radio channel or cell to facilitate the access to stronger base stations in the coverage area.

In one aspect of the present invention, the method includes the steps of evaluating the signal quality for the communication and lowering the dynamic threshold to encourage handoff if the signal quality indicator is lower than a preset quality threshold. The preset quality threshold represents a minimum acceptable signal quality level. The dynamic threshold is raised to discourage handoff if the signal quality indicator of the communication is at or near a maximum signal quality representing a signal having few errors.

In another aspect of the present invention, a method of handing off a cellular communication between a mobile unit and a cell within a cellular network is provided. The communication has a signal strength and signal quality measurable at the mobile unit. The method includes the steps of scanning the radio environment at the mobile unit to evaluate signal strength and signal quality conditions of alternative channels within the mobile unit cell or in neighboring cells, selecting a dynamic threshold corresponding to a signal strength value in accordance with the signal quality of the present communication and whether the signal quality is below or at a maximum or minimum value, and handing off the communication to a neighboring cell if the signal strength of an alternative channel measured at the mobile unit exceeds the dynamic threshold.

In yet another aspect of the present invention, a method is provided for adjusting a dynamic threshold for allowing handoff of a mobile unit communication. The method includes the steps of determining a signal strength indicator and a signal quality indicator for the communication, and adjusting the dynamic threshold in accordance with conditions of the communication at the mobile unit, including the link quality and whether the mobile unit is presently off-hook or in standby mode.

In yet another aspect of the present invention, an apparatus for handing off a cellular communication between a mobile unit and a base station within a cellular network is provided wherein the communication has a signal strength and signal quality measurable at the mobile unit. The apparatus includes means for scanning the radio environment at the mobile unit to evaluate signal strength and signal quality conditions of alternative channels within the mobile unit's cell or in neighboring cells, means for determining whether the mobile unit is participating in an off-hook communication or a standby communication, means for selecting a dynamic threshold corresponding to a signal strength value in accordance with the signal quality of the present communication and whether the signal quality is below or at a maximum or minimum value, and means for handing off the communication to an alternative channel if the signal strength of the alternative channel measured at the mobile unit exceeds the dynamic threshold.

Thus, by utilizing the present invention, the dynamic handoff threshold is adapted in accordance with the link quality of the present communication channel. If the present communication has acceptable quality and strength, the present invention modifies the threshold to discourage handoff even though stronger neighboring cells or channels may exist. Conversely, if the present communication is degrading in quality, the handoff threshold is decreased to encourage handoff to a neighboring cell likely to establish a high-quality link. Through the use of the present invention, the utilization of system processing resources and the overall quality of the system will be improved.

It is to be understood that both the foregoing general description and the following detailed description are exemplary and explanatory and are intended to provide further explanation of the invention as claimed.

The invention, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 4:
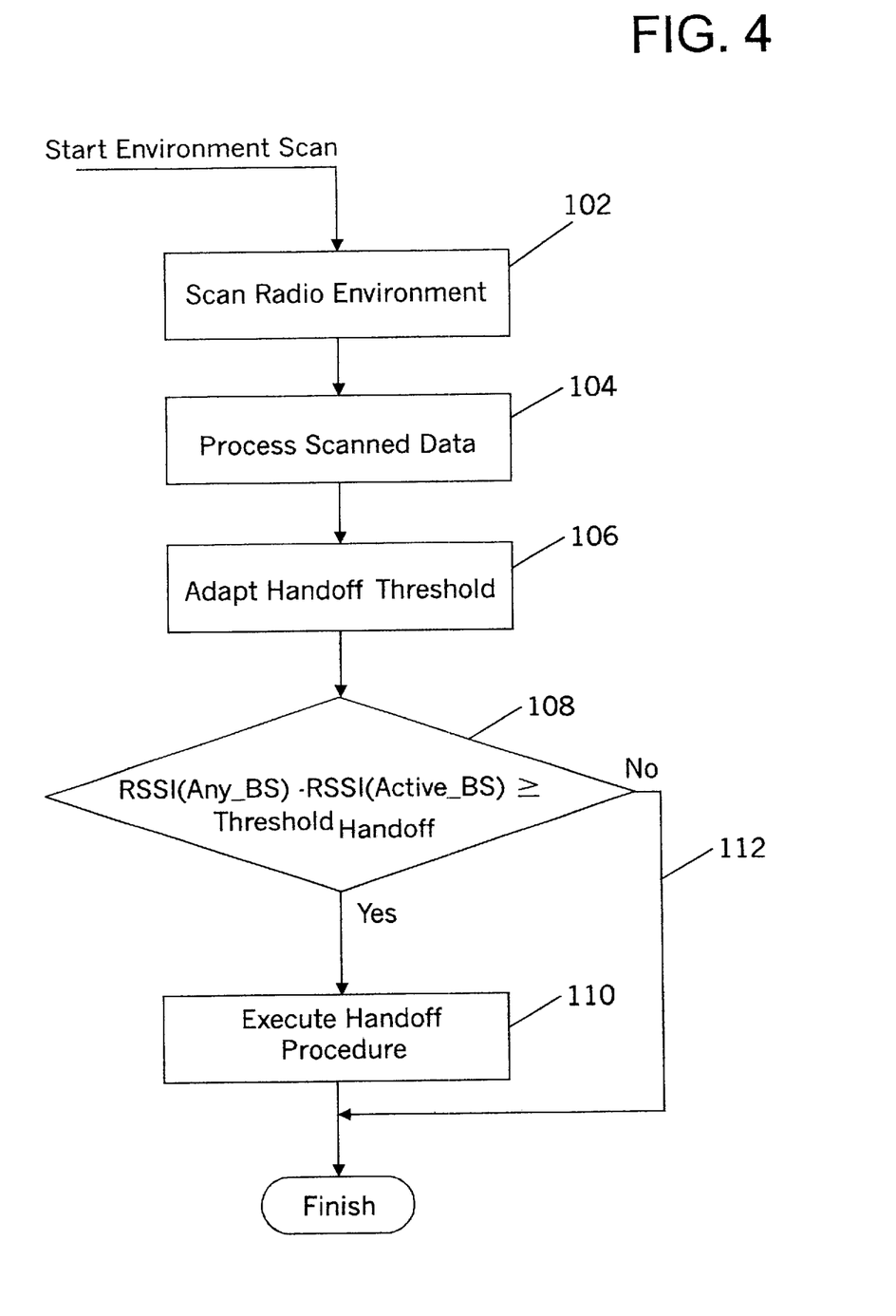
FIG. 4 is a flow diagram illustrating an adaptive threshold handoff procedure utilizing the present invention.

FIG. 4 is a general flow diagram of the handoff process used in the preferred embodiment of the present invention. As shown in the diagram at box 102, in a typical digital mobile unit, the mobile unit will periodically scan for channels in the radio environment within a certain time interval. In the alternative, the mobile unit can also continuously scan the radio environment. The scanning process scans not only the channels in adjacent cells, but also scans channels within the cell that the mobile unit is currently using. In the preferred embodiment, link quality and signal strength of nearby cells are scanned, along with similar parameters for the present communicating channel. The scanned data is processed at 104 within the mobile unit. The radio frequency signal strength is assigned an indicator value RSSI for each channel, and the signal quality is assigned a signal quality indicator value (LQI) for each channel. The RSSI values may be averaged with previously scanned and stored values.

The dynamic handoff threshold, which exists as a threshold RSSI value initially assigned by the mobile unit, is next adapted or adjusted at 106 in accordance with dynamic channel conditions such as the LQI of the present communication at the mobile unit. This procedure is described in more detail further below.

Next, at 108, as is the procedure with conventional handoff methods, the RSSI of the active communication cell is compared with the RSSI of the scanned neighboring cells to determine whether any neighboring cells have an RSSI exceeding the handoff threshold. If so, then the handoff procedure to transfer the communication to the stronger cell is executed at box 110. Handoff is bypassed at 112 if the RSSI of the active cell does not exceed the threshold.

Figure 5:
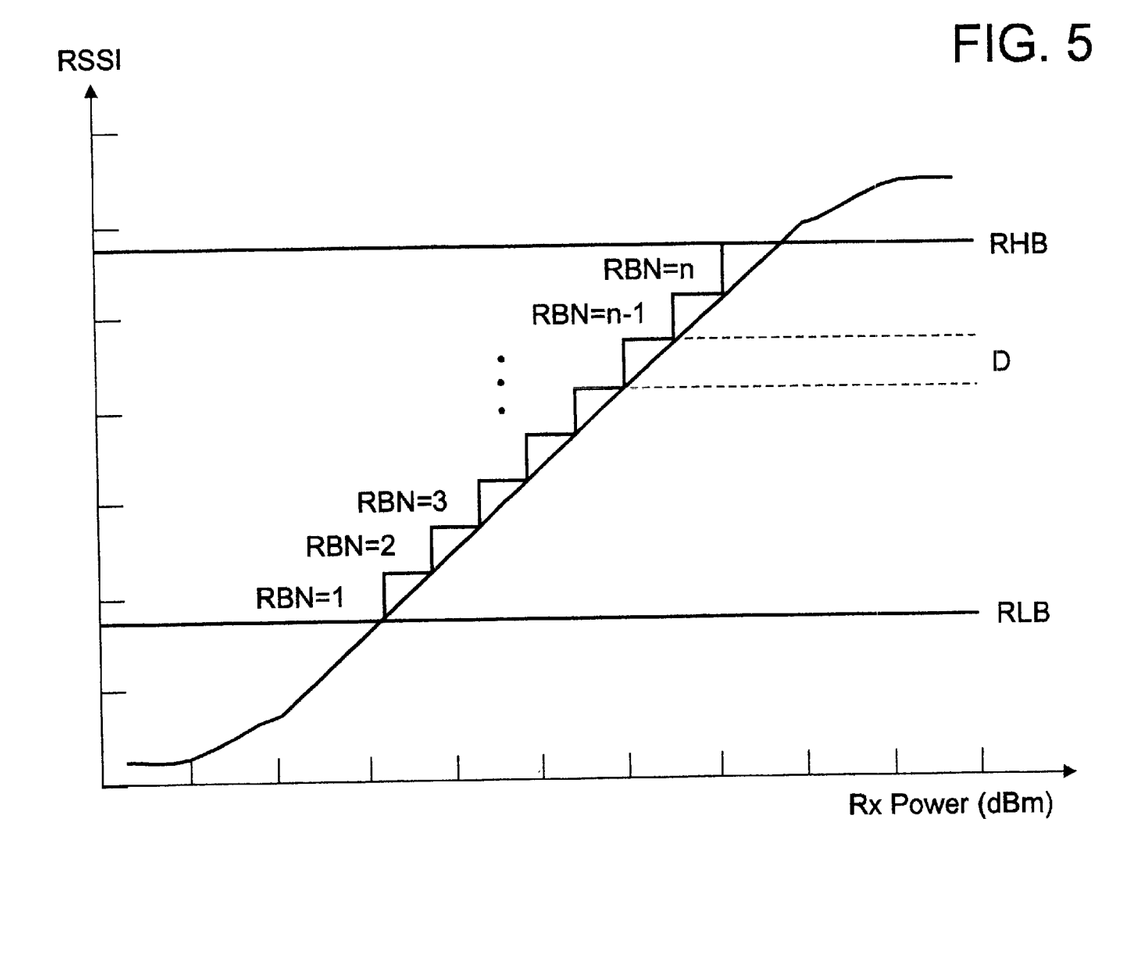
FIG. 5 is a graphical chart illustrating the parameters governing the adaptation of a handoff threshold utilized in the present invention.

The diagram of FIG. 5 shows a plot of RSSI vs. power that is useful in defining various parameters affecting the adaptation of the dynamic handoff threshold. As shown in the Figure, the linear signal curve is divided equally into n bands. RBN denotes the RSSI band number. The predetermined low bound RSSI of the linear signal curve range for a particular channel is denoted by RLB. This value is application dependent, and will differ depending on cellular density and mobile power. Any channel with an RSSI below RLB will be regarded as a free channel. For example, in an unlicensed PCS system in the continental United States, a typical value for RLB is −85 dBm. Likewise, RHB is the high bound RSSI, a predetermined ceiling maximum RSSI value. This value is also application dependent. D denotes the RSSI band size for each equally divided portion of the curve.

An important parameter used in adapting the dynamic threshold is the quality of the present signal. As shown in the diagrams that follow, the notation LQI denotes a Link Quality Indicator. This parameter can be derived from one or more link quality indicators such as BER (used in the IS-136 system), synchronization errors, CRC errors, rms-phase errors, etc. $LQI_{TH}$ is a threshold LQI value indicating that link is suffering minor errors, but the voice or data quality that the LQI value represents is still acceptable to the user. $LQI_{MAX}$ denotes a radio link that is relatively error free.

Figure 6:
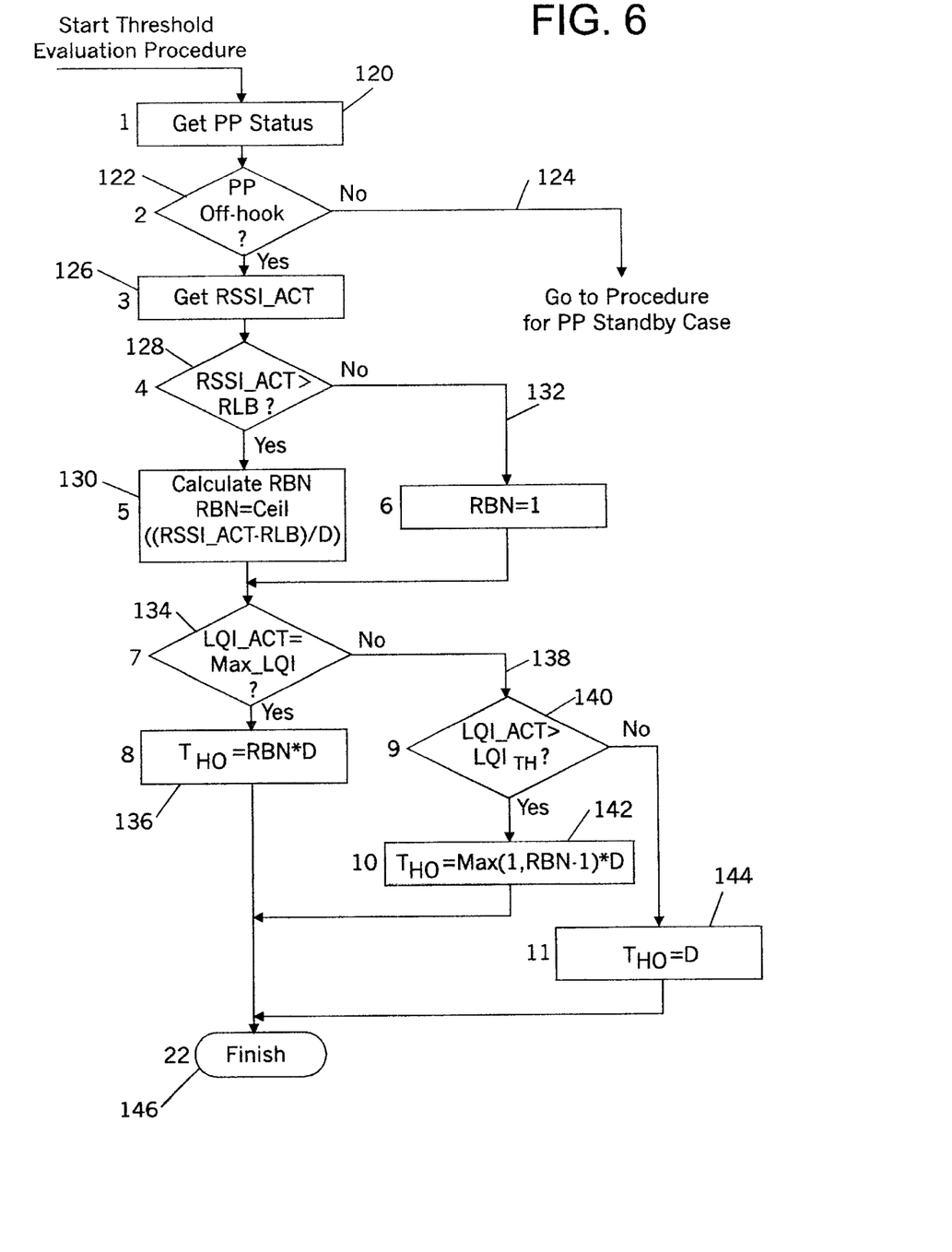
FIG. 6 is a flow diagram illustrating the threshold adaptation procedure of the present invention in an off-hook communication mode.

FIG. 6 is a flow diagram illustrating the method of the present invention for adapting or modifying the dynamic inter-cell handoff threshold, denoted here by $T_{HO}$. As indicated at box 106 shown in FIG. 4, the process of adapting the dynamic threshold begins after the mobile unit scans the surrounding radio environment. As shown at box 120 of FIG. 6, the status of the mobile unit handset is obtained and determined to be in either an off-hook or standby status (box 122). If the mobile unit and its present communication is in an off-hook mode, further link quality evaluation will be performed continuing with box 126. When the mobile unit is in standby mode, the present link quality is not as significant if it is not at a maximum, and handoff to achieve a stronger signal is encouraged by lowering the dynamic threshold. These steps are outlined further below beginning with branch 124 in conjunction with a discussion of FIG. 7. During an "off-hook" mode communication, the mobile unit participates in a two-way communication wherein the mobile unit can receive and transmit. During a "standby" mode communication, the mobile unit will receive or "listen" only to the signal in the presently selected channel or scan the radio environment for a channel.

Returning now to a discussion of FIG. 6 and the adaptation of the dynamic threshold in an off-hook communication, the mobile unit obtains the history table updating the RSSI value of the active communication channel (RSSI_ACT) at box 126. At box 128, the RSSI_ACT value is compared to the RLB low bound value of the RSSI band. If the active channel has an RSSI value within the defined band, the procedure continues to box 130 for calculation of the RBN number corresponding to the RSSI value. The RBN number is calculated as the least integer larger than (RSSI_ACT−RLB)/D, or RBN=Ceil((RSSI_ACT−RLB)/D). If the procedure at box 128 determines that RSSI_ACT is lower than the low bound value, the RBN number is set to 1 at step 132.

Next, the link quality of the current communication channel is evaluated. First, the link quality indicator (LQI) of the active channel is compared with a maximum LQI value that corresponds to a nearly error-free channel. If the LQI of the active channel is equal to the maximum, the dynamic handoff threshold is set at box 136 to RBN*D, which increases the threshold value. However, if the LQI value is below the maximum LQI, box 140, via procedure route 138, determines whether the actual LQI value is greater than a threshold ($LQI_{TH}$). The threshold LQI ($LQI_{TH}$) represents a voice or data quality level that is the minimum acceptable quality to a user. If the LQI_ACT is greater than $LQI_{TH}$, the dynamic handoff threshold is adjusted at box 142 to be equal to the larger of either 1 or RBN−1, or Max(1,RBN−1). This step lowers the threshold to a moderate degree to encourage handoff if the link quality appears to be in transition or otherwise degrading. In the alternative, if the LQI_ACT is not greater than $LQI_{TH}$, the dynamic handoff threshold is adjusted at box 144 to be equal to D. This lowers the threshold more significantly to ensure that the threshold results in handoff during the next procedure cycle shown in FIG. 4.

Figure 7:
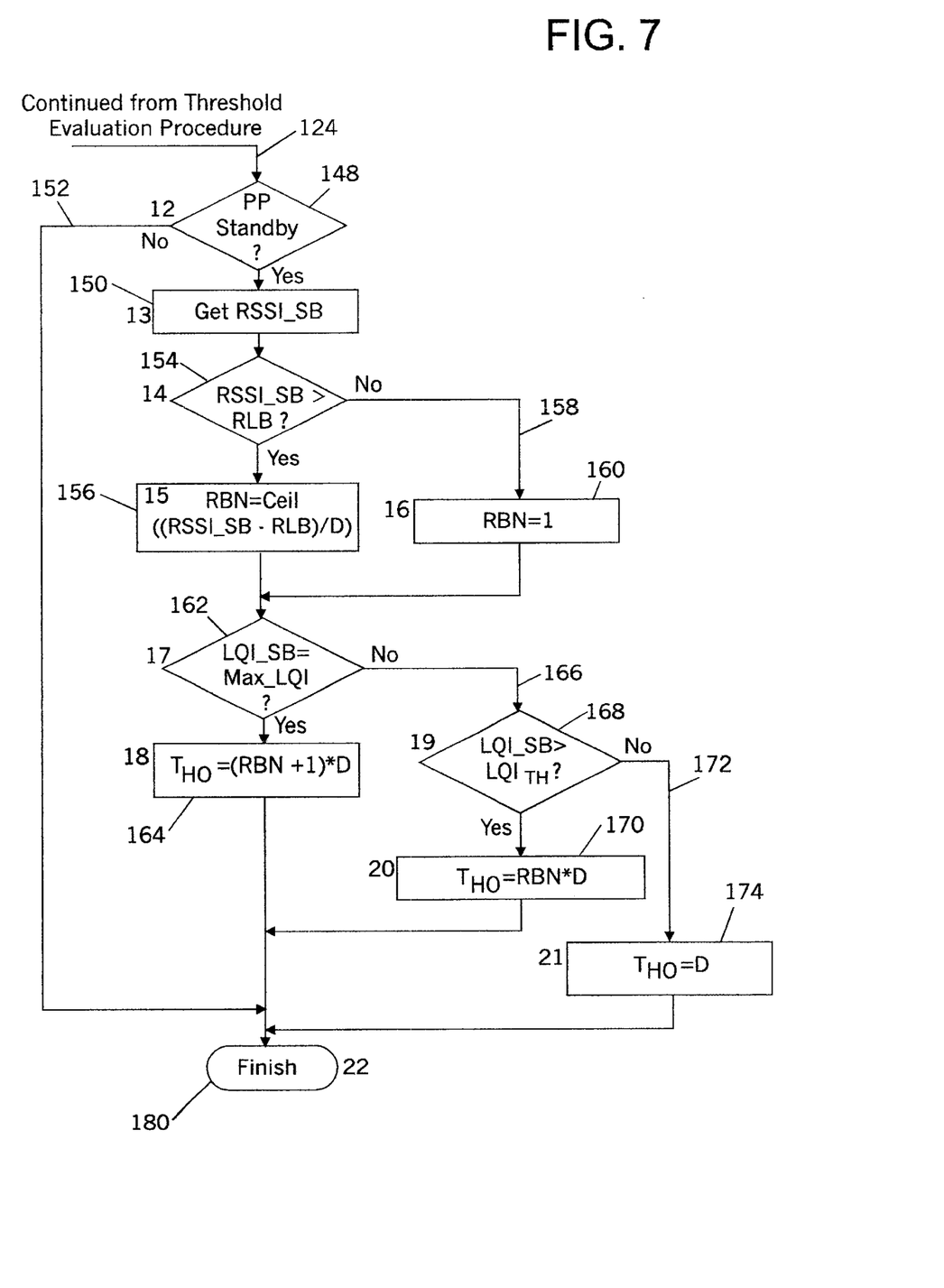
FIG. 7 is a continued flow diagram illustrating the threshold adaptation procedure of the present invention in a standby communication mode.

The dynamic threshold adaptation process for a mobile unit in standby mode is illustrated in FIG. 7. At box 148, the mobile unit obtains the RSSI value of the standby communication channel (RSSI_SB) at box 150. At box 154, the RSSI_SB value is compared to the RLB low bound value of the RSSI band. If the standby channel has an RSSI value greater than RLB, the procedure continues to box 156 for calculation of the RBN number corresponding to the RSSI value. The RBN number is calculated as RBN=Ceil((RSSI_SB−RLB)/D). If the procedure at box 154 determines that RSSI_SB is lower than the low bound value, the RBN number is set to 1 at step 160.

Next, the link quality of the current communication channel is evaluated. The link quality indicator (LQI) of the standby channel is compared with a maximum LQI value that corresponds to a nearly error-free channel. If the LQI of the standby channel is equal to the maximum, the dynamic handoff threshold is set at box 164 to (RBN+1)*D, which increases the threshold value significantly and discourages handoff. If the LQI value is below the maximum LQI, box 168 determines whether the standby LQI value is greater than a threshold LQI. The threshold LQI ($LQI_{TH}$) represents a voice or data quality level that is the minimum acceptable quality to a user. If the LQI_SB is greater than $LQI_{TH}$, the dynamic handoff threshold is adjusted at box 170 to be equal to RBN*D. This step raises the threshold to a moderate degree to discourage handoff if the link quality appears to be in transition. If the LQI_SB is not greater than $LQI_{TH}$, the dynamic handoff threshold is adjusted at box 174 to be equal to D. This lowers the threshold more significantly to ensure that the threshold results in handoff during the next procedure cycle shown in previous FIG. 4.

An apparatus implementing the method steps described above may also be provided utilizing conventional microprocessor hardware implementing circuitry, logic or software. In the presently preferred embodiment, the above method is implemented on a PWT mobile system unit in a M37702 microprocessor unit.

The present invention may be applied to cellular systems, PCS systems and multi-cell business wireless telecommunication systems for both indoor and outdoor deployment. The method is particularly useful for capacity limited wireless or cordless systems operating in unlicensed frequency band that normally have a dense base station deployment.

By using adaptive handoff threshold method as a modification to conventional handoff procedures, inter-cell handoff as shown in FIG. 4 will be triggered only when it is necessary to maintain the required quality of the channel. When the link quality of the channel tends to degrade, the handoff threshold will be reduced to facilitate the mobile unit's access to alternative base stations in the system coverage area, thereby improving the link quality. When the link quality is acceptable and RSSI is more than adequate, the handoff threshold will be increased to prevent unnecessary handoffs to neighboring base stations in overlap coverage areas of the system, thereby reducing signaling and information processing load to the system.

What is claimed is:

1. A method of handing off a cellular communication between a mobile unit and a base station within a cellular network, said communication having a signal strength and signal quality measurable at said mobile unit, said method including the steps of:

scanning the radio environment at the mobile unit to evaluate signal strength conditions of the present and alternative channels in the radio environment;

scanning the radio environment at the mobile unit to evaluate signal quality conditions of the present and alternative channels in the radio environment, wherein said signal quality is derived from at least one link quality indicator;

determining a dynamic threshold based at least in part on a signal strength value and whether said mobile unit is participating in an off-hook communication or a standby communication, and variably adjusting the dynamic threshold based at least in part on the signal quality of the present communication and whether said signal quality is below or at a maximum or minimum value; and handing off the communication to one of said alternative channels if the difference between the signal strength of the present communication and one of said alternative channels measured at the mobile unit exceeds said dynamic threshold.

2. The method of claim 1 further comprising the step of determining whether said mobile unit is participating in an off-hook communication or a standby communication.

3. The method of claim 2 wherein said step of determining a dynamic threshold further comprises the steps of determining whether the signal quality of said communication is at a maximum or at a minimum acceptable quality.

4. The method of claim 3 wherein said dynamic threshold is set at an initial value and subsequently raised if the mobile unit is participating in an off-hook communication and the signal quality of the communication is at said maximum acceptable quality.

5. The method of claim 3 wherein said dynamic threshold is set at an initial value and subsequently lowered if the mobile unit is participating in an off-hook communication and the signal quality of the communication is greater than a preset quality threshold that represents a minimum acceptable signal quality level and lower than said maximum quality.

6. The method of claim 5 wherein said threshold is lowered further if the mobile unit is participating in an off-hook communication and the signal quality of the communication is lower than said preset quality threshold.

7. The method of claim 3 wherein said dynamic threshold is set at an initial value and subsequently raised if the mobile unit is participating in a standby communication and the signal quality of the communication is at said maximum acceptable quality.

8. The method of claim 7 wherein said dynamic threshold is set at an initial value and subsequently raised if the mobile unit is participating in a standby communication and the signal quality of the communication is greater than a preset quality threshold that represents an acceptable signal quality level and lower than said maximum quality.

9. The method of claim 8 wherein said threshold is lowered if the mobile unit is participating in a standby communication and the signal quality of the communication is lower than said preset quality threshold acceptable quality.

10. The method of claim 1 further comprising the step of lowering the dynamic threshold if the signal quality of the communication is lower than a preset quality threshold that represents a minimum acceptable signal quality level.

11. The method of claim 10 further comprising the step of raising the dynamic threshold if the signal quality of the communication is at or near a maximum signal quality representing a signal having very few errors.

12. The method of claim 1 wherein said signal quality is quantified as a signal quality indicator value determined at the time the radio environment is scanned.

13. The method of claim 1 wherein said link quality indicator includes at least one of the signal-to-noise ratio, bit error rate, synchronization errors, CRC errors, and rms-phase errors.

14. A method for adjusting a dynamic threshold for allowing handoff of a mobile unit communication being received at the mobile unit on a selected channel, said mobile unit having scanning capability and said threshold is based at least in part on a signal strength level, said method comprising:

determining a signal strength indicator for said communication;

determining a signal quality indicator for said communication, wherein said signal quality indicator is derived from at least one link quality indicator; and adjusting the dynamic threshold in accordance with conditions of said communication at the mobile unit including whether the mobile unit is presently off-hook or in standby mode, the signal strength indicator and the signal quality indicator, wherein said dynamic threshold is based at least in part on said signal strength level.

15. The method of claim 14 further comprising the step of scanning the radio environment at the mobile unit to evaluate signal strength and signal quality conditions of available alternative channels before the step of selecting the dynamic threshold.

16. The method of claim 15 wherein said dynamic threshold is adjusted by lowering the dynamic threshold if the signal quality indicator is lower than a preset quality threshold that represents a minimum acceptable signal quality level, and raising the dynamic threshold if the signal quality indicator of the communication is at or near a maximum signal quality representing a signal having few errors.

17. The method of claim 14 wherein said link quality indicator includes at least one of the signal-to-noise ratio, bit error rate, synchronization errors, CRC errors, and rms-phase errors.

18. A method for adjusting a dynamic signal strength threshold for allowing handoff of a mobile unit communication, said method comprising:

evaluating the signal quality for said communication, wherein said signal quality is derived from at least one link quality;

lowering the dynamic threshold to encourage handoff if the signal quality indicator is lower than a preset quality threshold that represents a minimum acceptable signal quality level, wherein said dynamic threshold is based at least in part on a signal strength level and whether said mobile unit communication is in an off-hook or standby mode; and raising the dynamic threshold to discourage handoff if the signal quality indicator of the communication is at or near a maximum signal quality representing a signal having few errors, wherein said dynamic threshold is based at least in part on said signal strength level and whether said mobile unit communication is in an off-hook or standby mode.

19. The method of claim 18 wherein said link quality indicator includes at least one of the signal-to-noise ratio, bit error rate, synchronization errors, CRC errors, and rms-phase errors.

20. An apparatus for handing off a cellular communication between a mobile unit and a base station within a cellular network, said communication having a signal strength and signal quality measurable at said mobile unit, said apparatus comprising:

means for scanning the radio environment at the mobile unit to evaluate signal strength conditions of the present and alternative channels;

means for scanning the radio environment at the mobile unit to evaluate signal quality conditions of the present and alternative channels, wherein said signal quality is derived from at least one link quality indicator;

means for determining whether said mobile unit is participating in an off-hook communication or a standby communication;

means for determining a dynamic threshold based at least in part on a signal strength value in accordance with the signal quality of the present communication, whether said signal quality is below or at a maximum or minimum value and whether said mobile unit is participating in an off-hook communication or a standby communication; and means for handing off the communication to an alternative channel if the difference between the signal strength of the present communication and said alternative channel measured at the mobile unit exceeds said dynamic threshold.

21. The apparatus of claim 20 wherein said apparatus comprises a mobile unit operating within a cellular network.

22. The apparatus of claim 20 wherein said link quality indicator includes at least one of the signal-to-noise ratio, bit error rate, synchronization errors, CRC errors, and rms-phase errors.

* * * * *